(12) United States Patent
Gross

(10) Patent No.: US 7,775,889 B2
(45) Date of Patent: Aug. 17, 2010

(54) UNIVERSAL CROSS JOINT WITH AXIAL INSULATION

(75) Inventor: Norbert Gross, Duesseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/347,957

(22) Filed: Dec. 31, 2008

(65) Prior Publication Data

US 2009/0176584 A1  Jul. 9, 2009

Related U.S. Application Data

(63) Continuation of application No. 11/276,052, filed on Feb. 10, 2006, now Pat. No. 7,488,256.

(30) Foreign Application Priority Data

Feb. 11, 2005  (EP) .................................. 05100997

(51) Int. Cl.
*F16D 3/43* (2006.01)
(52) U.S. Cl. ........................................ 464/92; 464/125
(58) Field of Classification Search .................. 464/87, 464/92, 125, 126, 88, 132, 136
See application file for complete search history.

(56) References Cited

U.S. PATENT DOCUMENTS

| | | | |
|---|---|---|---|
| 197,495 A * | 11/1877 | Ralston | ................... 464/125 X |
| 1,180,468 A | 4/1916 | Bartlett | |
| 1,456,068 A | 5/1923 | Lord | |
| 1,642,775 A | 9/1927 | Henry | |
| 1,694,064 A | 12/1928 | Jencick | |
| 1,702,363 A | 2/1929 | Peters | |
| 1,855,640 A * | 4/1932 | Lord | ...................... 464/132 X |
| 2,024,777 A | 12/1935 | Neumann | |
| 2,537,847 A | 1/1951 | Eldon | |

(Continued)

FOREIGN PATENT DOCUMENTS

DE  100 01 270 A1  7/2001

(Continued)

OTHER PUBLICATIONS

Abstract for DE 100 01 270 A1.

(Continued)

*Primary Examiner*—Greg Binda
(74) *Attorney, Agent, or Firm*—O'Brien Jones, PLLC

(57) ABSTRACT

A universal joint comprises a first joint yoke having bearing bores at axially opposite yoke arms and being connected with the drive shaft, a first pin bearer being connected to the first joint yoke; a second joint yoke having bearing bores at axially opposite yoke arms and being connected with the driven shaft, a second pin bearer being connected to the second joint yoke; and an elastic coupling element connected to the cross member at each pin bearer. The first and second joint yokes are arranged radially at an angle of 90° in relation to each other to form an internal space. The first and second pin bearers each comprise an appendage such that each pin bearer extends through a respectively associated joint yoke and protrudes with its appendage over an outer side of the respective joint yoke opposite to the internal space.

12 Claims, 2 Drawing Sheets

U.S. PATENT DOCUMENTS

| | | | |
|---|---|---|---|
| 3,342,041 A | 9/1967 | Nebiker, Jr. | |
| 4,121,437 A | 10/1978 | Michel | |
| 4,229,951 A | 10/1980 | Jedlicka | |
| 4,412,827 A | 11/1983 | Petrzelka et al. | |
| 4,850,933 A | 7/1989 | Osborn | |
| 5,267,904 A | 12/1993 | Geisthoff | |
| 5,551,919 A | 9/1996 | Cherpician | |
| 6,026,703 A | 2/2000 | Stanisic et al. | |
| 6,685,569 B2 | 2/2004 | Kurzeja et al. | |
| 6,893,350 B2 | 5/2005 | Menosky et al. | |
| 6,923,726 B1 | 8/2005 | Lindenthal et al. | |
| 2004/0152526 A1 | 8/2004 | Sekine et al. | |
| 2004/0224778 A1 | 11/2004 | Menosky et al. | |

FOREIGN PATENT DOCUMENTS

| | | |
|---|---|---|
| EP | 0 160 599 B1 | 7/1988 |
| EP | 0 361 745 A1 | 4/1990 |
| EP | 0 563 940 A2 | 10/1993 |
| EP | 0 967 411 A2 | 12/1999 |
| FR | 2 568 329 A1 | 1/1986 |
| GB | 851174 | 10/1960 |
| GB | 942495 | 11/1963 |
| WO | WO 01/51823 | 7/2001 |

OTHER PUBLICATIONS

Abstract for EP 0 563 940 A2.
Abstract for FR 2 568 329 A1.
Abstract for WO 2001/051823.
Search Report for EP 05100997.

* cited by examiner

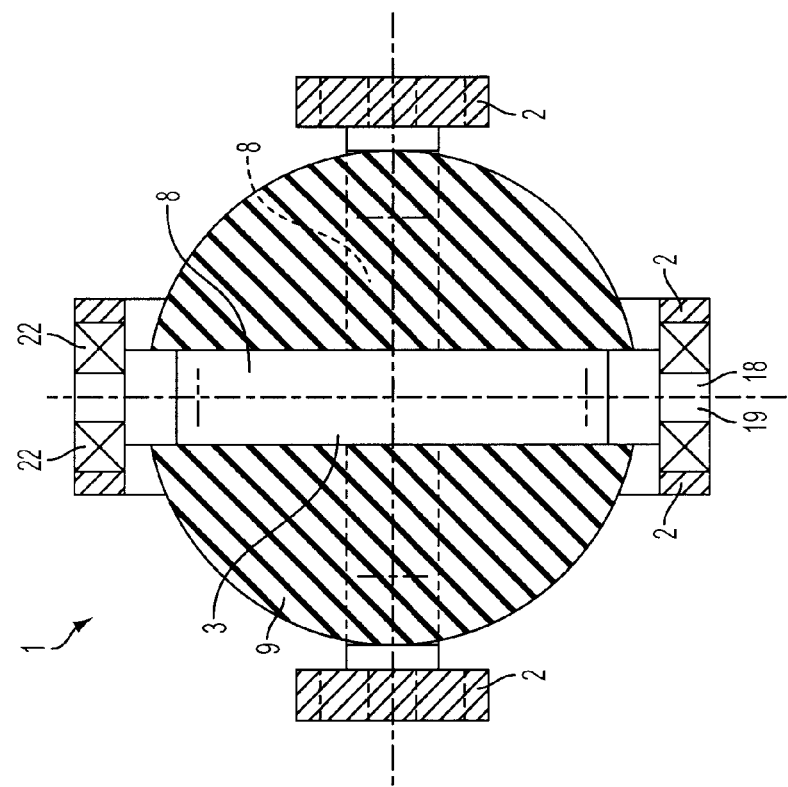
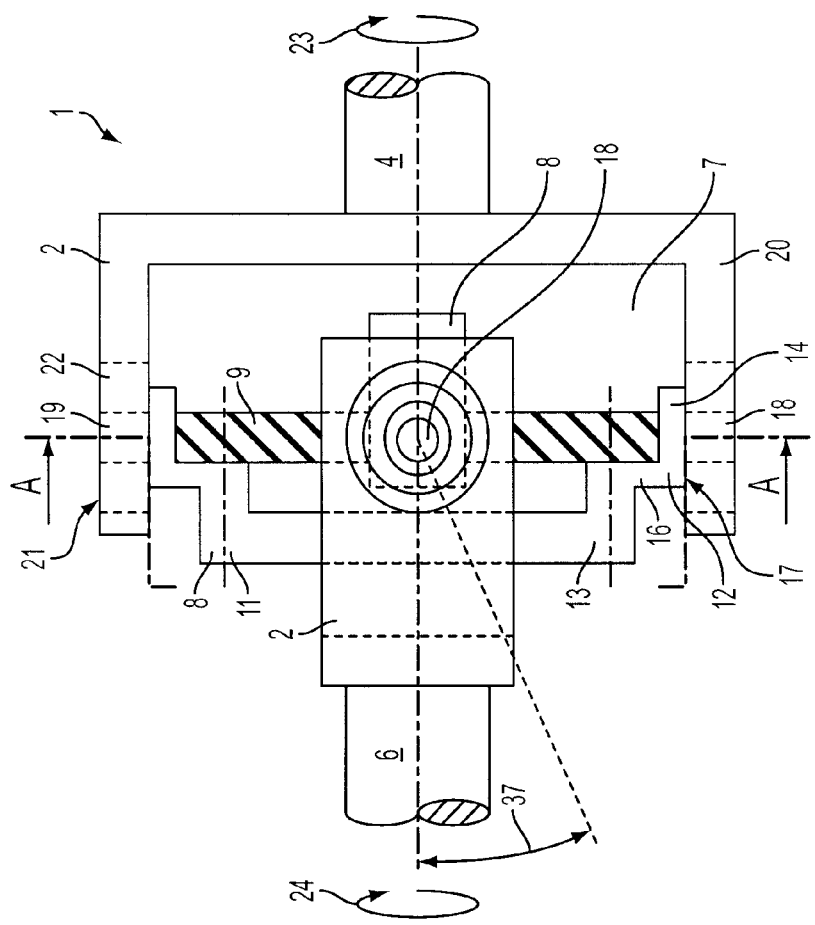
FIG. 1
FIG. 2

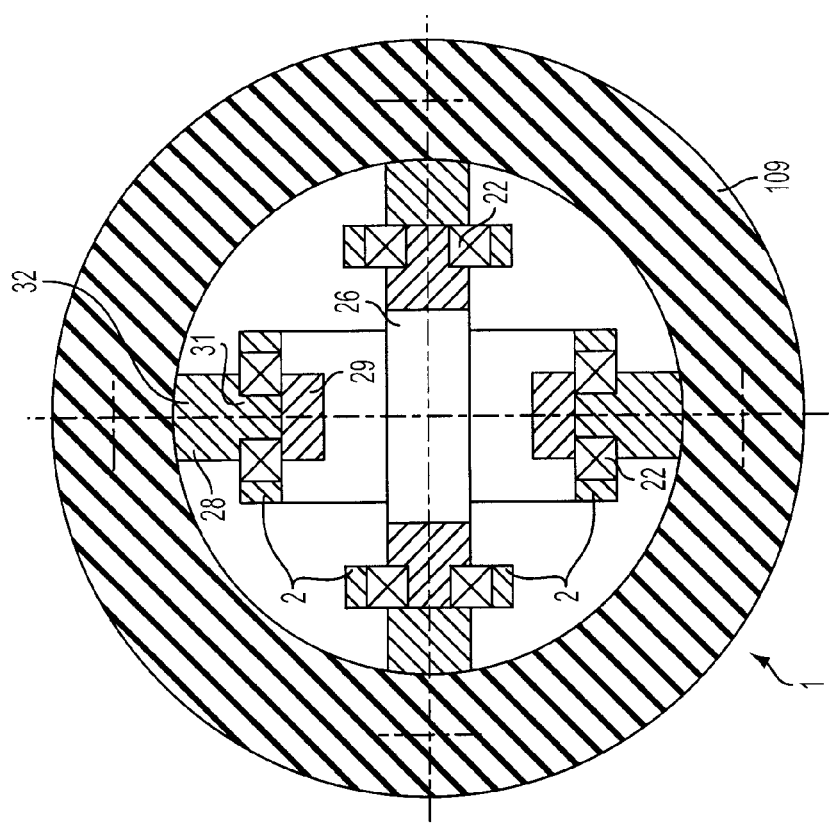
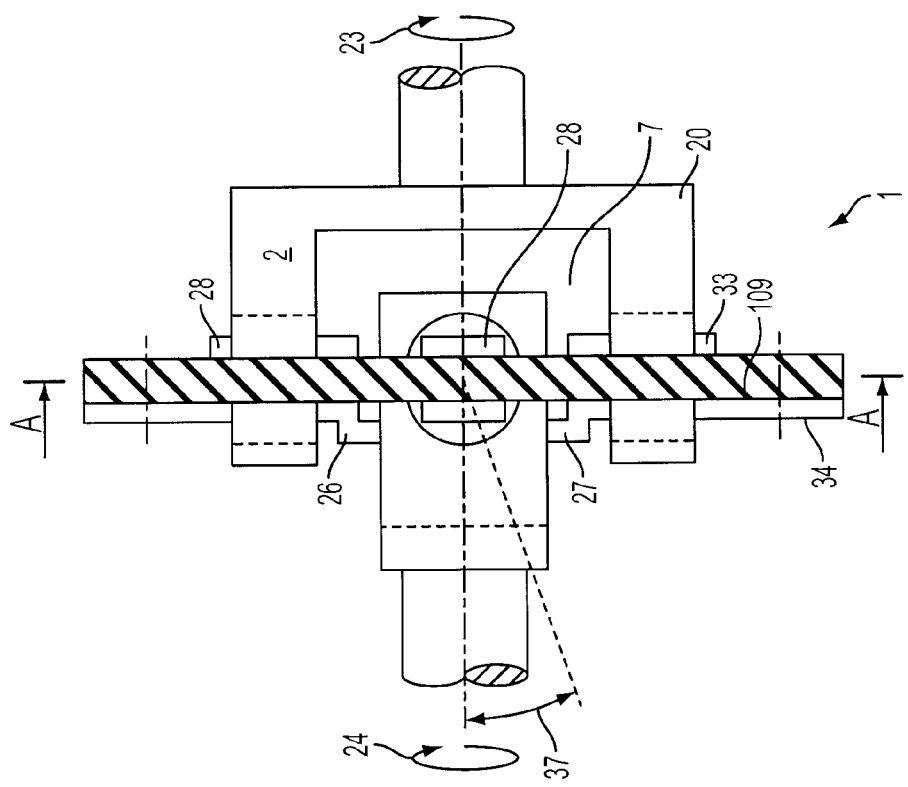

UNIVERSAL CROSS JOINT WITH AXIAL INSULATION

This is a continuation of U.S. patent application Ser. No. 11/276,052, filed Feb. 10, 2006, now U.S. Pat. No. 7,488,256, which claims priority to European patent application No. 05100997.5, filed Feb. 11, 2005, the entire contents of which are incorporated herein by reference. The present invention is related to U.S. patent applications Ser. No. 11/276,047 entitled "Axial Insulation for a Universal Joint" (now U.S. Pat. No. 7,445,555), Ser. No. 11/276,049 entitled "Axial Insulation for a Universal Cross Joint", Ser. No. 11/276,051 entitled "Insulation for Universal Cross Joint" (now U.S. Pat. No. 7,445,554), and Ser. No. 11/276,053 entitled "A Cardanic Cross Joint With Insulation" (now U.S. Pat. No. 7,517,283), filed simultaneously herewith.

FIELD OF THE INVENTION

The invention relates to a cardan joint having two joint yokes and a cross member, wherein one of the joint yokes is connectable or connected with a driven shaft or a drive shaft, and the other joint yoke is connectable or connected to a shaft to be driven or a drive shaft.

BACKGROUND OF THE INVENTION

Cardan or universal joints are usually used when two torque-transmitting shafts whose aligned orientation is not always ensured are to be connected with each other. The cardan joint then usually consists of two opposing joint yokes that are arranged twisted radially at an angle of 90° in relation to each other that each represents one end of the two shafts that are to be connected in an articulated manner, The cross member, which consists of two pin bearers offset against each other by 90°, is disposed between the joint yokes, the cross member being made of one piece so that the two pin bearers are rigidly connected with each other. The pin bearers are each supported, pivotally about their axes, in the two joint yokes.

With regard to the transmission of driving forces, the skilled person is regularly presented with the task of transmitting the rotational movement on the one hand, but, on the other, of eliminating vibrations and shocks if possible. Such interferences may, for example, be caused by vibrations from the drive unit. This problem is especially noticeable in automobile engineering, in particular in the area of the drive train, for example in the area of the cardan shaft where the vibrations between drive assembly and rear axle are transmitted without hindrance, and in the area of the steering line or in the steering column where, should conventional cardan joints be used, no insulation whatsoever is effected against low-frequency vibrations or shocks imposed by road bumps. Such interferences may, on the one hand, lead to damages in the drive train or the steering column and/or to adverse effects of an acoustic or mechanical nature for the driver.

For the purpose of uncoupling with regard to acoustics or vibration dynamics, in particular in the steering column, it is, for example, known to use a torsional elastic coupling with a so-called Hardy disk as an axially elastic coupling element or a loop disk. The Hardy disk is disposed, for example, in the steering column between the bottom cardan joint and a steering housing or steering gear or between the cardan joints. The Hardy disk, which is rigid in the direction of rotation, is formed such that it is soft in the direction of the steering column. As principle requires, the bending stiffness of the Hardy disk is relatively small. This causes a distortion of the Hardy disk with the bending moments from the cardan joint if the Hardy disk is arranged in series with the cardan joint, as is commonly the case. Since a Hardy disk alone (without a cardan joint), at least given appropriate life expectancies, is not suitable for connecting non-aligned shafts, the number of components is disadvantageously increased with the necessary arrangement in series with the cardan joint. Furthermore, the axial constructional space is increased thereby, and the usual compensation of the discontinuities by means of two cardanic joints arranged in anti-phase is disturbed by the additional Hardy disk since it works like an additional joint when placed in series.

The following is a discussion of relevant art pertaining to cardan joints. The discussion is provided only for understanding of the invention that follows. The summary is not an admission that any of the work described below is prior art to the claimed invention.

EP 0 563 940 B1 discloses a universal joint comprising two forks which are situated opposite one another with a 90° offset and which are each a part of each one of two shafts which are to be pivotally interconnected, or which are adapted each to be connected to each one of two shaft ends which are to be pivotally interconnected, and comprising two journal pairs which are offset by 90° from another and which form a journal cross and which are rotatable about their axis in the respective fork ends and, relative to the rotational axis of the shafts, are mounted for torque transmission, the two journal pairs being at least slightly pivotable relatively to one another in the plane formed by the journal cross, each journal being mounted in an anchor bracket and adjacent anchor brackets are interconnected by an elastic coupling element, whereby the elastic coupling element contains reinforcing inlays in loop form, which are disposed to be stationary and which each interconnect two adjacent anchor brackets and in that the reinforcing inlays in loop form are situated along the periphery of the universal joint in a loop plane which is perpendicular to the plane of the journal cross.

It must be regarded as a main disadvantage of the cross joint disclosed in EP 0 563 940 B1 that the two pairs of pins connect the own pins with each other integrally in different ways: The one pair uses a through bolt, the other pair is configured from two short pins that are connected with each other by means of an additional connecting portion. For this reason, a different production tool is required for the production of each pin or pair of pins, which makes the production of the cross joint extremely cost-intensive. The necessary connecting portion furthermore limits the axial and radial clearance of the joint. Furthermore, the need for axial constructional space can be optimized.

It is a further disadvantage that the cross joint disclosed in EP 0 563 940 B1 takes a lot of constructional effort and is thus very susceptible to malfunction. It must be considered a further disadvantage that the yokes must be designed small with regard to width and that thus, their yoke bearings must be designed to be bigger (more expensive) in order to transmit a sufficient torque given reasonable construction dimensions. If the flexible ring is damaged in the cross joint of EP 0 563 940 B1, a replacement ring must be supplied via the anchors. In addition, the cross joint is difficult to balance, especially in the case of shafts that rotate quickly.

EP 0 160 599 describes a flexible coupling device comprising first and second yokes which are intended to be fixed, respectively, to a drive member and a driven member, which each have arms arranged so that the arms of the first yoke are interposed with those of the second yoke, whereby to each yoke is fixed a support and these two supports are arranged opposite each other so that the facing surfaces of these supports are substantially perpendicular to the rotation axis of the device, in that an elastomeric linking element is fixed to these facing surfaces of the supports, and in that each support is fixed to the corresponding yoke by means of a spindle engaging in at least one opening in said support and in holes provided in the arms of said yoke.

GB 942,495 discloses a universal coupling for shafts comprising a flexible disc having coupling elements extending one on each side thereof, each for connection to one of the shafts to be coupled, the coupling elements being pivoted to the disc about axes at right angles and lying normally to the axis of the disc whereby, in use of the coupling, angular misalignment of the coupled shafts may be accommodated by pivoting of the coupling elements without flexure of the disc, the disc being composed wholly or mainly of plastic, rubber or the like resilient material which is unrestrained so as to be free to flex during use of the coupling.

It must be considered as a main disadvantage of the connection for shafts disclosed in GB 942,495 that the coupling elements are rotated with clearance towards the disk and with significant friction, the torsion clearance and the friction merely satisfying modest demands.

Therefore, what is needed is an improved universal joint of the type mentioned at the beginning with simple means in such a way that it is cheaper to produce from an economic standpoint, without the elastic coupling element having to convey significant bending moments.

SUMMARY OF THE INVENTION

This invention provides a universal joint for coupling a drive shaft and a driven shaft comprising two joint yokes each yoke having bearing elements at axially opposite yoke arms. One joint yoke is connected with the driven shaft and the other joint yoke being connected to the drive shaft. The two joint yokes are arranged radially at an angle of 90° in relation to each other to form an internal space. The universal joint also includes a cross member having two separate identical pin bearers arranged orthogonally in relation to each other. Each of the pin bearers are pivoted in the respectively associated joint yokes. Furthermore, an elastic coupling element is included and connected to the cross member at each pin bearer.

Because of the identical form of the two pin bearers, the respective pin bearers may be produced or processed in a single production tool. In this manner, a universal joint is provided which can clearly be manufactured cheaper in production for economic reasons, because the respective pin bearers can be manufactured or processed with only a single production tool, at the same time making a reduction of logistical and storage costs possible since a separate storage or a provision of different pin bearers, for example, just in time, can be omitted.

Advantageously, a hitherto commonly used elastic uncoupling member arranged in series (additional elastic coupling) can thus be done without in the universal joint according to the invention. The elastic coupling element is advantageously arranged parallel to the universal joint. Within the sense of the invention, a parallel arrangement means that the elastic coupling element is directly associated with the universal joint. The universal joint according to the invention has half a cross member, namely only a single pin bearer, as well as the holding element for receiving the elastic coupling element. Thus, the universal joint as a unit with the elastic coupling element integrated into the joint is easier and cheaper to produce. In addition, a universal joint is provided which satisfies high demands with regard to torsion clearance and to the bearing friction.

It is favorable within the sense of the invention if the respective pin bearer with its respective pin engages into the associated joint yoke and ends flush with an outer side of the respective joint yoke that is opposite to the internal space. Of course, the pin may also protrude a little over the outer side, and may possibly be secured with a securing element, for example, a shaft securing ring.

In this case, the elastic coupling element is expediently arranged in the internal space. In a preferred embodiment, the elastic coupling element is formed as a torsion-resistant, flexural elastic or axially elastic disk, in particular as a Hardy disk, wherein the elastic coupling element may also be formed as a torsion-resistant, flexural elastic or axially elastic ring or annulus of round, multi-angular or polygonal design.

In a further preferred embodiment, it is expedient if the respective pin bearer reaches through the respectively associated joint yoke and protrudes with its appendage over an outer side of the respective joint yoke opposite the internal space.

Expediently, when seen in cross section in this embodiment, the appendage with its protruding area is formed L-shaped with a transversal web and with a base web that is directed radially outwardly and perpendicular to the transversal web.

Advantageously, it is provided in this case that the elastic coupling element is formed as a torsion-resistant, flexural elastic or axially elastic ring or annulus.

The connection of the elastic coupling element with the pin bearers in the two preferred embodiment may, for example, take place by a screw joint, rivet joint, vulcanization or the like.

The universal joint according to the invention is particularly suitable for use in a steering column of a motor vehicle, wherein axial shocks can be filtered out as compared to a conventional universal joint. This behavior is especially desirable in structures of steering columns because thus, axial shocks, for example due to stimuli from the road, can be kept away from a steering wheel without having to make sacrifices with regard to torsional stiffness. By integration of the elasticity through the doubly pivotally supported elastic coupling element into the universal joint, it is avoided that a bending stiffness must also be provided, in addition to the axial compliance. By means of the universal joint according to the invention, the axial compliance can be made greater so that insulation properties are also improved over conventional elastic couplings in structures of steering columns. The integrated elastic coupling element does not have to convey significant bending moments because the elastic coupling element is kept free of bending by bearings in the axis of the moments. This makes ideal compliance properties in axial direction without bending resistances with optimal stiffness in the direction of rotation possible. The large axial compliance of the joint can favor omitting an otherwise commonly used slip joint from the steering column, which has to compensate fitting tolerances and stimuli from the road. In addition, the universal joint according to the invention, if formed with a disk, can be produced with comparably large yoke widths and, advantageously, with correspondingly small-sized yoke bearings in an appropriate size, with much larger torques being transmittable than in a universal joint with small yoke widths and larger (more expensive) yoke bearings. In addition, the integration of the ring according to the invention permits a simple conveying of the flexible ring in axial direction.

The invention can further include one or more features being subject matter of the dependent claims. Modes for carrying out the present invention are explained below by reference to non limiting embodiments of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

Further advantageous embodiments of the invention are disclosed in the dependent claims and the following description of the figures. In the figures:

FIG. 1 shows a side view of a universal joint,

FIG. 2 shows a representation along a section A-A from FIG. 1,

FIG. 3 shows a side view of a universal joint in a second embodiment, and

FIG. 4 shows a representation along a section A-A from FIG. 3.

In the different figures, the same parts are always provided with the same reference numeral so that they are also only described once, as a rule.

DETAILED DESCRIPTION OF THE INVENTION

The FIGS. 1 to 2 show a universal joint 1 having two joint yokes 2 and a cross member 3. One of the joint yokes 2 is connected to a driven shaft 4 or drive shaft 4 the other joint yoke 2 being connected to the shaft 6 to be driven or drive shaft 6. The two joint yokes 2 are arranged twisted radially at an angle of 90° in relation to each other so that the two joint yokes 2 form an internal space 7. The cross member 3 is disposed in the internal space 7. The cross member 3 is formed of two separate pin bearers 8 arranged orthogonally in relation to each other. The pin bearers 8 are supported pivotally in the respectively associated joint yokes 2 and connected with each other via an elastic coupling element 9.

Seen in cross section, the two pin bearers 8 are formed identical to each other.

Because both pin bearers 8 are formed in an identical manner, only one will be described in the following. The pin bearer 8 has a base web 11 at the end of which, respectively, a Z-shaped appendage is connected. The Z-shaped appendage 12 has a connecting arm 13 as well as a contact arm 14. The Z-shaped appendage 12 is connected via the connecting arm 13 with the base web 11, a base arm 16 being provided for the connection of the connecting arm 13 with the contact arm 14. The base arm 16 in the exemplary embodiment shown is oriented in a parallel direction to the base web 11, so that the pin bearer 8 is formed as a double-U-shaped rotation body, as it were.

The contact arms 14 are arranged towards an inner side 17 of the associated joint yoke 2, one pin 18 of the pin bearer 8, respectively, reaching through a bearing bore 19 in the associated joint yoke 2. The bearing bore 19 is placed in yoke arms 20 of the respective yoke joint 2.

The pin 18 ends flush with an outer side 21 of the associated joint yoke 2 opposite the inner side 17.

The pin 18, respectively, is pivotally supported in a bearing 22 in the associated joint yoke 2 or the bearing bore 19, with the contact arm 14 abutting the bearing 22 or the side of the bearing 22 oriented in the direction of the inner side 17 of the bearing. The bearing 22 can be formed as needle bearing, ball bearing or another type of anti-friction bearing or as plain bearing. The bearings 22 are fixed, in a suitable manner, radially relative to the axis of the joint, in the joint yokes 2 or their yoke arms. Possible embodiments are, for example, press fit, bonding or positive fit (abutting of the shoulder, spring ring or the like) of the outer races of the bearings in the associated yoke arms or, for example, by means of positive fit of the bearings, e.g. by means of one-sided and/or two-sided shoulder fit on the pin bearer. Preferably, at least one bearing per joint yoke is capable of accepting axial bearing forces in addition to the radial bearing forces.

The pin bearers 8 are separated spatially within the internal space 7. The elastic coupling element 9, which is connected, respectively, with the contact arm 16 of the Z-shaped appendage 12, is provided for the connection of the two pin bearers 8. A screw joint, rivet joint and, or vulcanization or the like can, for example, be provided as the connection of the elastic coupling element 9 with the base arm 16.

The elastic coupling element 9 is formed, in the exemplary embodiment according to FIG. 1 shown, as a torsion-resistant, flexural elastic or axially elastic disk, preferably as a torsion-resistant, flexural elastic Hardy disk. However, it is also conceivable that the elastic coupling element may be formed as a torsion-resistant, flexural elastic or axially elastic Ring. For example rubber or the like can be provided as material for the elastic coupling element 9.

In the universal joint 17 an input moment (direction of rotation 23) is transmitted via the driven shaft 4 (drive shaft) onto the associated pin bearer 8, and thence, as tensile/compression stress, onto the elastic coupling means 9 to the crossing pin bearer 8 and then on to the joint yoke 2 of the shaft 6 to be driven or drive shaft. This is represented by means of the output moment (direction of rotation 24) that is equidirectional with the input moment (direction of rotation 23). With regard to the bending stiffness required to a small degree, the elastic coupling element 9 is selected such that it is ensured that a rotation of the pin 18 can take place during an inclination (inclination 37) and rotation of the joint yoke 2 in order to overcome the friction torque according to the selected bearing clearance in the bearings 22. In axial direction, the elastic coupling element thus permits a compliance that can be used for insulation, while the contour of the elastic coupling element 9 provides a high torsional stiffness.

FIGS. 3 and 4 show a further embodiment of the universal joint 1 according to the invention.

In contrast to the exemplary embodiment shown in FIGS. 1 and 2, the elastic coupling element 109, as a ring or annulus, is arranged not in the internal space 7, but outside around the respective joint yokes 2, which is why the pin bearers 26 are formed differently in comparison to the pin bearers 8 described in FIGS. 1 and 2. The elastic coupling element 109 is formed as a torsion-resistant, flexural elastic or axially elastic ring or annulus of round, multi-angular or polygonal design.

The pin bearers 26 according to the exemplary embodiment of the FIGS. 3 and 4, however, are again formed in an identical manner, which is why only one will be described in the following.

The pin bearer 26 has a base web 27 on which an appendage 28 is arranged.

The appendage 28 has three areas 29, 31 and 32 that merge into one another. The first area 29 is disposed in the internal space 7 and is formed essentially rectangularly when seen in cross section. The appendage is connected with the base web 27 by means of the first area 29. The second area 31 follows the first area 29 and reaches through the bearing bore 19 of the bearing 22 disposed in the associated joint yoke 2. In cross section, the second area 31 is formed thinner in relation to the first area 29, so that the pin bearer 26 with its second area 31 abuts the bearings 22 radially. The second area 31 preferably ends flush with the outer side 21 of the associated joint yoke 2, but it may also protrude slightly. The second area 31 is not discernible in FIG. 3. The third area 32, which in cross section is formed essentially L-shaped with a transversal web 33 and a base web 34 that is directed radially outward and perpendicular to the transversal web 33, follows the second area 31.

In the embodiment according to FIGS. 3 and 4, the elastic coupling element 109 is connected with the pin bearers 26 via the base web 34 of the third area 32. A screw joint, rivet joint, vulcanization or the like can preferably be provided as a connection.

The connection of the respective elastic coupling element 9, 109 with the respective pin bearers 8 or 26 is indicated by means of the chain-dotted axis in the FIG. 1 or 3.

The direct guiding of the pin bearers 8 or 26 from one bearing to the other bearing 22 within the respectively associated joint yoke 2 requires such a design of the pin bearers 8 or 26 that at their crossing point, a clearance is provided in order to permit a general axial compliance of the connection.

In the exemplary embodiments according to the FIGS. 1 to 4, the pin bearers 8 can also be operated, in principle, rotated by 180° in the bearings 22 fastened against the elastic coupling element 9, 109, which provides for additional adjustment options in the elastic coupling element 9, 109 with different axial stiffness at tensile and compression stress. In the position shown, advantages with regard to the fail-safe-behavior result from the chained arrangement of the respective joint yoke 2 with the associated pin bearer 8, since the spatial association of the pin bearers 8 with respect to the associated joint yoke 2 is maintained in case of a failure of the elastic coupling element 9, 109.

The universal joint 1 shown in the FIGS. 1 to 4 is particularly suitable for use in the steering column of a motor vehicle. The shafts 4 and 6 are shown oriented in alignment towards each other. In the vehicle, there usually is an angled position, relative to each other, with the universal joint maintaining the transmission of the rotation. The angled position is shown in FIGS. 1 and 3 by means of the angle of inclination 37.

What is claimed is:

1. A universal joint for coupling a drive shaft and a driven shaft, the universal joint comprising:
a first joint yoke having bearing bores at axially opposite yoke arms and being connected with the drive shaft, a first pin bearer being connected to the first joint yoke via pin bearer areas inserted into the bearing bores of the first joint yoke;
a second joint yoke having bearing bores at axially opposite yoke arms and being connected with the driven shaft, a second pin bearer being connected to the second joint yoke via pin bearer areas inserted into the bearing bores of the second joint yoke; and
an elastic coupling element connected to each pin bearer, wherein the first and second joint yokes are arranged radially at an angle of 90° in relation to each other to form an internal space and the first pin bearer and the second pin bearer each comprise appendages such that the appendages of each pin bearer extend through a respectively associated joint yoke and protrude beyond an outer side of the respective joint yoke opposite to the internal space, where the appendages connect with the elastic coupling element and each of the appendages has an L-shaped cross section with a transversal web and a base web that is directed radially outwardly and arranged perpendicular to the transversal web.

2. The universal joint according to claim 1, wherein the elastic coupling element is formed as a torsion-resistant, flexurally elastic ring.

3. The universal joint according to claim 1, wherein the elastic coupling element is guided around the joint yokes.

4. The universal joint according to claim 1, wherein the elastic coupling element is connectable with at least one of the pin bearers by a screw joint.

5. The universal joint according to claim 1, wherein the elastic coupling element is connectable with at least one of the pin bearers by a rivet joint.

6. The universal joint according to claim 1, wherein the elastic coupling element is connectable with at least one of the pin bearers by vulcanization.

7. A universal joint for coupling a drive shaft and a driven shaft, the universal joint comprising:
a first joint yoke having bearing bores at axially opposite yoke arms and being connected with the drive shaft;
a second joint yoke having bearing bores at axially opposite yoke arms and being connected with the driven shaft;
a connection assembly connecting the first joint yoke to the second joint yoke, the connection assembly comprising
a first pin bearer connected to the first joint yoke via pin bearer areas inserted into the bearing bores of the first joint yoke,
a second pin bearer being connected to the second joint yoke via pin bearer areas inserted into the bearing bores of the second joint yoke, and
an elastic coupling element adapted to connect the first and second pin bearers,
wherein an internal space is formed between the first joint yoke and the second joint yoke and the first pin bearer and the second pin bearer each comprise appendages that extend through a respectively associated joint yoke and protrude beyond an outer side of the respective joint yoke opposite to the internal space to connect with the elastic coupling element, while the remaining areas of the pin bearers fit within the internal space and do not extend beyond an outer surface of the yoke arms, and
wherein each of the appendages has an L-shaped cross section with a transversal web and a base web which is directed radially outwardly and arranged perpendicular to the transversal web.

8. The universal joint according to claim 7, wherein the elastic coupling element is formed as a torsion-resistant, flexurally elastic ring.

9. The universal joint according to claim 7, wherein the elastic coupling element is guided around the joint yokes.

10. The universal joint according to claim 7, wherein the elastic coupling element is connectable with at least one of the pin bearers by a screw joint.

11. The universal joint according to claim 7, wherein the elastic coupling element is connectable with at least one of the pin bearers by a rivet joint.

12. The universal joint according to claim 7, wherein the elastic coupling element is connectable with at least one of the pin bearers by vulcanization.

* * * * *